United States Patent Office

2,850,426
Patented Sept. 2, 1958

2,850,426

ANTHELMINTIC PIPERAZINE-PHOSPHORIC ACID COMPOSITIONS AND METHOD OF COMBATTING HELMINTH INFESTATIONS THEREWITH

Peter C. Hereld, Floral Park, N. Y., assignor to Chemo Puro Manufacturing Corporation, Long Island City, N. Y., a corporation of New York No Drawing. Application March 16, 1955
Serial No. 494,820

2 Claims. (Cl. 167—55)

The present invention relates to a new compound or addition product of piperazine and phosphoric acid and to a method of preparing the same.

Within recent years, it has been discovered that piperazine and its hydrate have desirable anthelmintic properties but that these substances have unsatisfactory physical properties and adverse side effects when administered for that purpose. As a result, intensive efforts have been made to develop piperazine derivatives, such as piperazine tartrate and piperazine citrate, but these derivatives are too soluble in water, have a bad taste and are not particularly high in piperazine content, the piperazine being the active moiety of the derivatives; for example, piperazine tartrate contains only 36% piperazine and piperazine citrate contains only about 40% piperazine, and both compounds are very soluble in water, which has been found to be a great disadvantage because water insolubility is highly desired. Piperazine adipate was subsequently developed, which is the best piperazine derivative to date. While this derivative is only soluble in water to the extent of about 5%, it contains only about 37% piperazine and is still characterized by a rather unpleasant taste and adverse side effects. The general considerations relating to piperazine derivatives and their anthelmintic potentialities were reported by Davies et al. in The Journal of Pharmacy and Pharmacology, 1954, vol. 6, pages 707–710. Since piperazine adipate does not represent the optimum solution of the problem of finding a highly suitable piperazine derivative, further investigations are being carried out in this field, and the problem has not, so far as I am aware, been fully solved.

In accordance with the present invention, I have discovered that the addition product of piperazine and phosphoric acid represents a markedly superior compound or derivative having excellent properties and characteristics for an anthelmintic agent. This addition product is in the form of a white powder which can be easily prepared without special reaction conditions and which is only very slightly soluble in water and has a pH value of 6.5. The product has a pleasant, slightly acidulous taste and contains an exceptionally high content of piperazine, being in that respect approximately 46½% based on the formula $C_4H_{10}N_2 \cdot H_3PO_4$.

The addition product is made by combining aqueous solutions of equi-molecular quantities of piperazine or its hexahydrate with phosphoric acid $H_3PO_4$. When these aqueous solutions are combined, the product $$C_4H_{10}N_2 \cdot H_3PO_4$$

is formed and can be readily recovered in the form of a white powder.

The addition product of piperazine and phosphoric acid according to the invention is useful as an anthelmintic agent for poultry, canines, felines, equines, porcines, and humans. For humans it is administered in plain compressed tablets, each of which contains 300 mg. of the piperazine phosphoric acid addition compound. For animal use, it is administered in a dosage which is the same as that of the adipate and is preferably administered by incorporating it in the animal feed or continuously at a low level in the drinking water, especially for poultry, but, as is generally known, the amount to be administered is related to the weight of the animal, and such is well understood per se in the art. The addition product of piperazine and phosphoric acid effects cures in at least 90% of the cases. It is particularly effective for pin worms and round worms but is generally useful as an ascaricide and vermifuge.

It is particularly surprising and unexpected that the addition product of piperazine and phosphoric acid would have such a low solubility in water because the related compounds piperazine tartrate and citrate are relatively much more soluble in water. The new addition product is particularly advantageous in that it contains approximately 46½% of the piperazine moiety, this being in excess of the percentage of piperazine in any previously used piperazine derivative. Piperazine itself and its hexahydrate, while exhibiting good anthelmintic properties, cannot be satisfactorily employed for this purpose, as has been well recognized.

The invention is defined by the appended claims:

I claim:

1. An animal feed composition containing as an essential active ingredient thereof the anthelmintic addition product of equi-molecular quantities of piperazine and phosphoric acid.

2. A method of combatting helminth infestations in animals which comprises contacting the helminths with a feed composition containing the anthelmintic addition product of equi-molecular quantities of piperazine and phosphoric acid as an essential active ingredient.

References Cited in the file of this patent

UNITED STATES PATENTS

| | | |
|---|---|---|
| 523,018 | Stoehr | July 17, 1894 |
| 597,454 | Bishop | Jan. 18, 1898 |

OTHER REFERENCES

Drug Trade News, December 3, 1956, p. 64.
Astruc: Chem. Abstr., vol. 3, 1909, p. 167[4].